United States Patent [19]

O'Connor

[11] Patent Number: 5,622,577
[45] Date of Patent: Apr. 22, 1997

[54] RAPID PROTOTYPING PROCESS AND COOLING CHAMBER THEREFOR

[75] Inventor: Kurt F. O'Connor, Carmel, Ind.

[73] Assignee: Delco Electronics Corp., Kokomo, Ind.

[21] Appl. No.: 520,115

[22] Filed: Aug. 28, 1995

[51] Int. Cl.$^6$ ...................................................... B32B 31/00
[52] U.S. Cl. .................. 156/62.2; 156/272.8; 156/275.5; 264/113; 264/125; 264/308; 264/497; 264/85
[58] Field of Search ............................. 156/272.2, 275.5, 156/379.6, 379.8, 498, 62.2, 272.8; 264/405, 113, 85, 308, 125, 126, 497

[56] References Cited

U.S. PATENT DOCUMENTS

| | | | |
|---|---|---|---|
| 4,863,538 | 9/1989 | Deckard | 156/62.2 |
| 5,296,081 | 3/1994 | Morin et al. | 156/498 |
| 5,342,919 | 8/1994 | Dickens, Jr. et al. | 528/323 |

FOREIGN PATENT DOCUMENTS

WO92/08692  5/1992  WIPO .

Primary Examiner—James Sells
Attorney, Agent, or Firm—Jimmy L. Funke

[57] ABSTRACT

A rapid prototyping process is provided by which prototype components can be fabricated that are suitable for conceptual evaluations. The rapid prototyping process of this invention is more efficient than comparable prior art processes, in that the previous requirement to completely process a prototype article within a single process chamber is eliminated, such that different process steps can be conducted simultaneously on different articles within a single process system. The process entails the steps of forming a prototype within a process chamber that generates the prototype through successively depositing and sintering individual layers of a powder material that fuses together so as to form the prototype. The prototype is then removed from the process chamber and cooled within a separate cooling chamber through which a nonoxidizing cooling medium flows.

20 Claims, 1 Drawing Sheet

RAPID PROTOTYPING PROCESS AND COOLING CHAMBER THEREFOR

The present invention generally relates to rapid prototyping processes used in the fabrication of conceptual models and prototypes. More particularly, this invention relates to a rapid prototyping process that entails a sintering operation performed in a primary process chamber, and employs a separate cooling chamber that enhances the efficiency and throughput of the prototyping process by enabling the final processing stages to be conducted outside of the primary process chamber.

BACKGROUND OF THE INVENTION

The fabrication of prototypes has long been a technique employed to evaluate the conceptual and functional feasibility of articles proposed for manufacture. Traditional prototyping techniques have generally entailed designing a component, followed by the manufacture of tooling from which the prototype is produced. While computer-aided design (CAD) techniques have become widely used in the design of both prototype and manufactured components, the conventional reliance on manufactured tooling to physically produce a prototype has been the dominating factor in determining when a prototype will become available, particularly for prototypes having complex geometries.

To reduce this lead time, CAD techniques have become more fully integrated with computer-aided manufacturing (CAM) techniques to eliminate the requirement for prototype tooling. Such methods include "rapid prototyping" (RP) processes, which generally entail the fabrication of a prototype from a material that is selectively cured or fused to form a unitary prototype. With rapid prototyping techniques, the period between prototype design and delivery can often be drastically reduced from several months required to fabricate prototype tooling, to as little as a few days.

Variations of rapid prototyping processes exist, with primary differences being the type and condition of the material being used to form the prototype, and the manner in which the material is fused or cured. Various materials can potentially be used, including powdered plastics, metals and ceramics. One known process involves the use of a photosensitive polymer in a liquid form. The liquid polymer is contained in a vat and successively cured in a manner that results in cured layers being successively fused together to form a unitary prototype. Suitable materials for this particular process are those that can be cured through exposure to a high-intensity light source, such as a laser beam, and include such materials as polycarbonates, nylons and investment casting waxes.

Regardless of the type of material used, rapid prototyping processes are generally adapted to quickly and accurately deposit several thousand individual layers, each having a thickness of typically less than about 0.5 millimeter, and fuse the deposited layers to form a desired prototype. Computer data and a machine controller controls the entire process such that only selective portions of the material are cured or fused in order to achieve the desired geometry for a given prototype.

While the fabrication of prototypes in the above manner eliminates the requirement for prototype tooling, further improvements in process efficiency would be desirable. A significant shortcoming of prior art rapid prototyping techniques is the common requirement that the prototypes be sintered and cooled within a processing chamber containing an atmosphere that will not oxidize, and therefore weaken, the sintered prototype. Cooling generally requires several hours, during which time a suitable nonoxidizing gas is flowed through the processing chamber. Consequently, the chamber is nonproductive during the cooling phase of the process, such that the overall efficiency of the process is significantly reduced.

Accordingly, it would be desirable if a rapid prototyping process existed by which a prototype could be fabricated from fused materials, yet avoided the requirement of employing a single chamber for all of the steps entailed in the process.

SUMMARY OF THE INVENTION

It is an object of this invention to provide a more efficient rapid prototyping process for the fabrication of prototypes.

It is a further object of this invention that such a process employs materials that can be selectively fused or sintered with a high-intensity light source.

It is another object of this invention that such a process employs a primary process chamber in which the step of sintering or fusing occurs, and a separate chamber in which the prototype is cooled, such that the primary process chamber is free for immediate use in a subsequent cycle.

It is yet another object of this invention that the primary process chamber and the separate chamber prevent oxidation of the prototype, so as to promote the strength of the prototype.

In accordance with a preferred embodiment of this invention, these and other objects and advantages are accomplished as follows.

According to the present invention, there is provided a rapid prototyping process by which prototype articles can be fabricated that are suitable for conceptual studies and preliminary evaluations. The rapid prototyping process of this invention is more efficient than comparable prior art processes, in that the previous requirement to completely process a prototype article within a single process chamber is overcome, such that different process steps can be conducted simultaneously on different prototype articles within a single process system.

In accordance with this invention, the rapid prototyping process entails the steps of forming a three-dimensional prototype within a process chamber that generates the prototype through successively depositing and sintering individual layers of a powder material, such that the layers fuse together to form the prototype. The prototype is then removed from the process chamber and cooled within a separate cooling chamber through which a nonoxidizing cooling medium flows. The cooling medium preferably flows through the cooling chamber such that the prototype is completely enveloped by the cooling medium.

In accordance with this invention, the cooling chamber is specially adapted to be used in conjunction with the process chamber, such that exposure of the prototypes to an oxidizing atmosphere is minimized. For example, the cooling chamber can be configured to enable a prototype to be transferred from the process chamber and into the cooling chamber with minimal exposure to atmosphere. To minimize oxidation of a prototype during transfer, the present invention can employ an additional sintering step that serves to "seal" the outer surface of the prototype, such that the surface is relatively impervious to oxidizing agents. In addition, an inert gas can be flowed over the prototype during the transfer operation in order to prevent oxidation of the prototype.

From the above, it can be seen that a significant advantage of the present invention is that a prototype article produced by the rapid prototyping process of this invention is not required to remain within a single processing chamber throughout the duration of the process, but instead is transferred between chambers such that different process steps can be conducted simultaneously on different parts within a single processing system and in the course of a single process cycle. As such, the overall efficiency of the prototyping process of this invention is significantly improved over prior art rapid prototyping processes, in which prototypes were required to remain within the same chamber throughout the processing cycle.

In addition, it can be appreciated that the cooling chamber of this invention is adapted to minimize oxidation of the prototype, such that the physical integrity of the prototype is not compromised by the enhanced efficiency of the process. The construction of the cooling chamber results in a cost-efficient apparatus that is specially configured to operate in cooperation with the primary process chamber for the purpose of providing a protective atmosphere for the prototype.

Finally, the rapid prototyping process of this invention is characterized by advantages associated with prior art processes, including the ability to fabricate prototypes having complex geometries without the use of prototype tooling. As such, prototypes fabricated in accordance with this invention are deliverable within a period drastically shorter than traditional prototyping methods.

Other objects and advantages of this invention will be better appreciated from the following detailed description.

BRIEF DESCRIPTION OF THE DRAWING

The above and other advantages of this invention will become more apparent from the following description taken in conjunction with the accompanying drawings, in which.

DETAILED DESCRIPTION OF THE INVENTION

Figure 1:
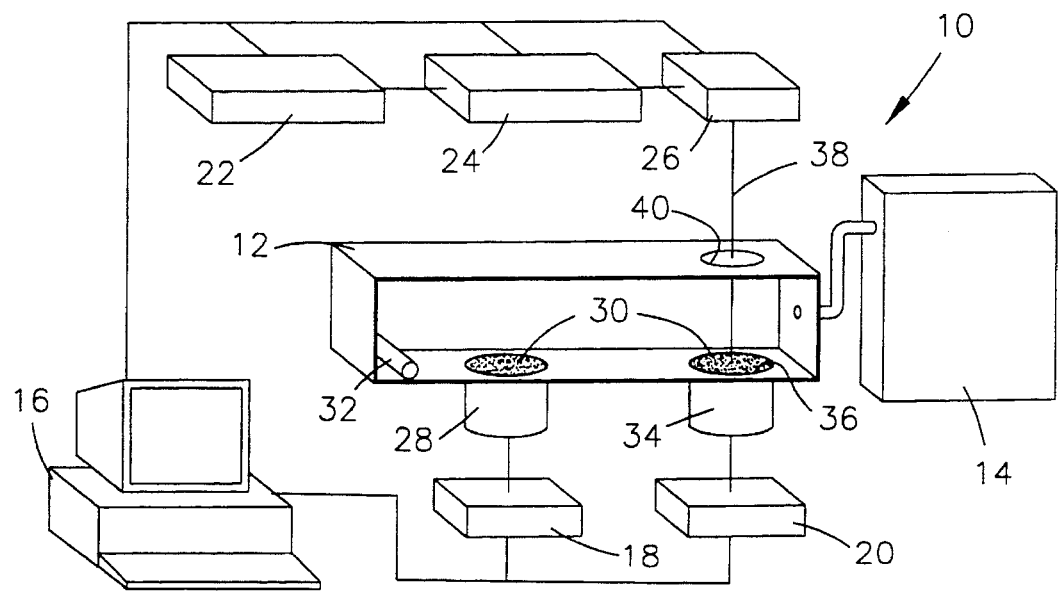
FIG. 1 is a schematic representation of a rapid prototyping system in accordance with a preferred embodiment of this invention.

FIG. 1 represents a rapid prototyping system 10 of a type particularly suitable for use in the process on this invention. The system 10 is generally composed of a primary process chamber 12 whose interior atmosphere is controlled with a suitable environmental control unit 14. The environmental control unit 14 serves to maintain an atmosphere that will not oxidize a prototype (not shown) processed within the process chamber 12. Also shown in FIG. 1 is a process control computer 16 that controls a feed motor 18, a build motor 20, and a laser generating system composed of a laser 22, optics 24 and galvanometers 26. The computer 16 serves to synchronize the operation of the motors 18 and 20 and the laser generating system, such that the efficiency of the overall process is promoted and the required dimensional precision for the prototype is achieved.

The function and operation of the above equipment are generally as follows. The computer 16 is programmed to control the operation of the feed motor 18, such that a suitable material will be dispensed by a feed cylinder 28 into the process chamber 12 at appropriate intervals during the process. Preferably, the feed cylinder 28 dispenses a powdered or granular material 30, which can generally be any material capable of being pulverized and fused or sintered, including ceramics, metals, polymer-coated powders, and thermoplastics such as a polycarbonate, nylon or investment casting wax. A roller mechanism 32 within the process chamber 12 is then activated to distribute the material 30 over the lower surface of the chamber 12, including a platform 36 formed in the chamber floor by a build cylinder 34. The build cylinder 34 is controlled by the build motor 20, and is retracted with each subsequent cycle of the roller mechanism 32 such that additional material 30 will be successively collected on the platform 36 as the platform 36 is lowered.

With each operation of the roller mechanism 32, a laser beam 38 is generated by the laser 22, focused and collimated by the optics 24 and, based on feedback from the galvanometers 26, regulated by the computer 16 at a desired power level. The beam 38 is then directed through a port 40 in the process chamber 12 and toward the material 30 on the platform 36. By selectively moving the beam 38 along a predetermined path dictated by coordinates entered in the computer 16, a portion of the material 30 on the platform 36 is sintered and fused to form a single layer or tier of the desired prototype. The beam 38 is focused such that sintering occurs only within the upper exposed level of material 30 on the platform 36. Successive passes are made by the laser beam 38 with each cycle of the feed cylinder 28, rolling mechanism 32 and build cylinder 34, with the individual layers formed by each cycle being fused together to form the prototype. The unexposed material on the platform 36 and in process chamber 12 remains in powder form, such that the prototype can be readily lifted from the remaining powder at the end of the process cycle.

To the extent described above, the rapid prototyping system 10 is generally referred to as a selective laser sintering (SLS) technique, and within the knowledge of one skilled in the art. Accordingly, the specific operating parameters for the individual system components will not be discussed in significant detail. It is generally sufficient to note that the feed cylinder 28, roller mechanism 32, and build cylinder 34 are typically operated to successively form and fuse layers having thicknesses on the order of up to about 0.5 millimeter, though lesser or greater thicknesses are foreseeable, depending on the particular geometry of the prototype being produced. Furthermore, the laser 22 will generally be selected on the basis of the particular conditions of the process, including the specific type or types of fusible materials used. In practice, a $CO_2$ laser has been found to perform particularly well with the system 10 described.

Figure 2:
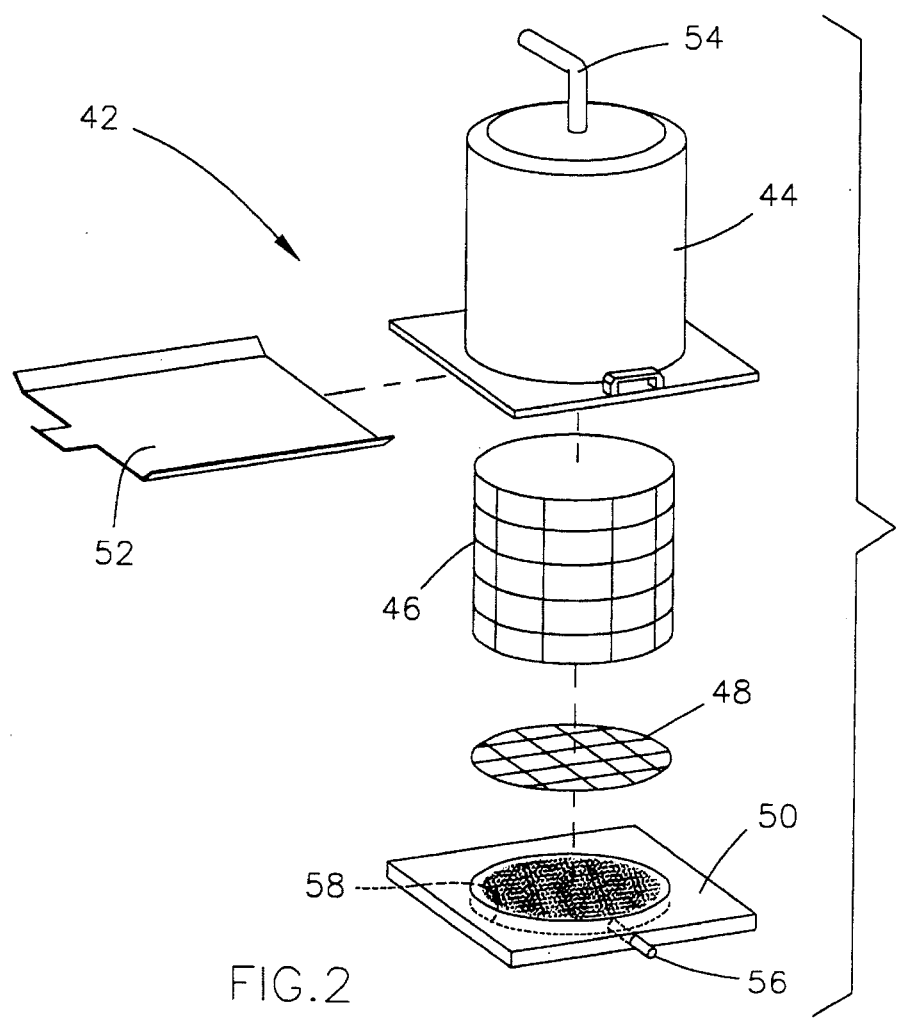
FIG. 2 is an exploded view of a cooling chamber for use within the prototyping system of FIG. 1 in accordance with the preferred embodiment of this invention.

For the purpose of fabricating prototypes from materials susceptible to oxidation, it is essential that the environmental control unit 14 maintain within the process chamber 12 a nonoxidizing atmosphere in order for such prototypes to exhibit suitable mechanical strength. As such, the process chamber 12 is preferably adapted to flow an inert gas, such as nitrogen, over the prototype and through the build cylinder 34 in order to maintain a nonoxidizing atmosphere in the chamber 12, as well as assist in maintaining the chamber 12 at a uniform temperature. In the prior art, this requirement for maintaining a nonoxidizing atmosphere has necessitated that the prototype remain within the process chamber 12 until the prototype has sufficiently cooled to the point where it is no longer susceptible to oxidation. According to the present invention, this burdensome requirement is eliminated by the use of a separate cooling chamber 42 shown in FIG. 2.

As illustrated, the cooling chamber 42 generally includes an enclosure 44, a screen structure 46 secured within the enclosure 44, a filter plate 48, a base 50, and a gate 52. The enclosure 44 and the base 50 cooperate to form a gas-tight chamber through which a suitable nonoxidizing gas, such as nitrogen or argon, is flowed. Preferably, the enclosure 44 is equipped with an inlet port 54 and the base 50 is equipped with an outlet port 56 through which the gas is introduced and removed, respectively, from the cooling chamber 42. A suitable arrangement is for the gas to be supplied from a pressurized source to the inlet port 54, while a vacuum pump (not shown) draws the gas from the cooling chamber 42. The temperature and flow rate of the gas through the cooling chamber 42 is generally established so as to achieve a suitable cooling rate for the prototype contained within.

In use, a prototype is produced within the process chamber 12 as previously described, and then transferred to the cooling chamber 42. Transfer can be achieved by placing the enclosure 44 within the process chamber 12 and over the platform 36 and prototype, which at this time will be below the floor of the process chamber 12. As noted previously, the process chamber 12 is preferably adapted to flow an inert gas over the prototype and through the build cylinder 34 during operation of the chamber 12. In accordance with this invention, this flow through the chamber 12 can be increased once the chamber 12 is opened to permit insertion of the enclosure 44 and removal of the prototype, so as to envelop the prototype with the inert gas during transfer and therefore further reduce the potential for oxidation of the prototype. In order to further minimize the effect of briefly exposing the prototype to the operating atmosphere surrounding the system 10, a final pass can be performed by the laser beam 38 over the entire exposed surface of the prototype prior to the process chamber 12 being opened, so as to further fuse or sinter the material at the surface and thereby render the surface more resistant to penetration by gas.

Once the enclosure 44 is in place, the build cylinder 34 raises the prototype and any unexposed material on the platform 36 up into the enclosure 44. The gate 52 is then slid beneath the prototype and enclosure 44 so as to separate the prototype from the platform 36. The enclosure 44, prototype and gate 52 are then removed as a unit from the process chamber 12 and positioned on the base 50, which includes the filter plate 48 located over a recess 58 formed in the base 50. The gate 52 is then slid out from between the enclosure 44 and the base 50, and a gas-tight seal is achieved between the enclosure 44 and base 50. Thereafter, an inert gas is introduced into the cooling chamber 42 through the inlet port 54 on the enclosure 44, flows over the prototype, and is then drawn from the chamber 42 through the outlet port 56 in the base 50. The screen structure 46 forms a plenum within the enclosure 44, forcing the inert gas to flow downward through the enclosure 44 and therefore over and around the prototype, thereby maximizing the cooling effect. The filter plate 48 serves to support the prototype and prevent loose, unexposed material from being pulled from the cooling chamber 42 by the inert gas.

From the above, it can be seen that an advantage of the present invention is that a prototype part produced by the rapid prototyping system 10 shown in FIG. 1 is not required to remain within the process chamber 12 throughout the duration of the rapid prototyping process, but instead is transferred to the cooling chamber 42 where the final processing stage is performed. As such, the process chamber 12 can be immediately used for the next sintering operation, while a cool down cycle is performed on a recently-sintered prototype. Consequently, the rapid prototyping process of this invention enables different process steps to be conducted simultaneously on different prototypes within a single process system and during a single process cycle, resulting in an enhanced overall efficiency for the process.

Another advantage of this invention is that the cooling chamber 42 provides an uncomplicated apparatus for preventing oxidation of a prototype, such that only a modest increase in the cost of the system 10 is incurred, while having a significant positive impact on the efficiency of the system 10. As such, the cooling chamber 42 enhances efficiency without compromising the physical integrity of the prototype. Furthermore, the construction of the cooling chamber 42 results in a cost-efficient apparatus that is specially configured to operate in cooperation with the primary process chamber 12 for the purpose of providing a protective atmosphere for the prototype. Because the cooling cheer 42 is specifically configured to perform a cooling cycle, the efficiency of a cool down cycle conducted within the cheer 42 can be significantly higher than that possible within the primary process chamber 12. As a result, the cooling cheer 42 can be controlled to affect or optimize the physical characteristics of the prototype, depending on the desired application.

Finally, the rapid prototyping process of this invention is readily capable of producing high quality prototypes having complex geometries without the traditional use of prototype tooling. As such, prototypes fabricated in accordance with this invention can be delivered within a period drastically shorter than traditional prototyping methods.

While our invention has been described in terms of a preferred embodiment, it is apparent that other forms could be adopted by one skilled in the art. For example, processing equipment and methods could be adopted other than those suggested here, or appropriate materials could be substituted for those disclosed. Accordingly, the scope of our invention is to be limited only by the following claims.

Claims:

1. A rapid prototyping process comprising the steps of:

forming a prototype within a process chamber that generates the prototype through successively depositing individual layers of material that are fused together so as to form the prototype;

transferring the prototype from the process chamber to a cooling chamber while preventing exposure of the prototype to an oxidizing agent;

removing the cooling chamber from the process chamber; and cooling the prototype within the cooling chamber while flowing a nonoxidizing cooling medium over the prototype.

2. A rapid prototyping process as recited in claim 1 wherein the cooling step further comprises delivering the cooling medium to the prototype such that the prototype is enveloped by the cooling medium.

3. A rapid prototyping process as recited in claim 1 wherein the forming step further comprises sequentially sintering the individual layers of material by exposure to a laser beam.

4. A rapid prototyping process as recited in claim 1 wherein the material is a powered or granulated material.

5. A rapid prototyping process as recited in claim 1 wherein the material comprises at least one material selected from the group consisting of ceramics, metals and polymers.

6. A rapid prototyping process as recited in claim 1 wherein the transferring step further comprises flowing an inert gas over the prototype.

7. A rapid prototyping process as recited in claim 1 further comprising the step of forming the prototype to have a surface resistant to penetration by gas prior to the prototype being removed from the processing chamber.

8. A rapid prototyping process as recited in claim 1 wherein deposition and fusing of the individual layers of material are controlled by a computer.

9. A rapid prototyping process as recited in claim 1 wherein the cooling step comprises the steps of enclosing the prototype between an upper enclosure and a base member that form a gas-tight compartment, and supporting the prototype with a screen structure disposed within the gas-tight compartment.

10. A rapid prototyping process comprising the steps of:
    forming a three-dimensional prototype within a process chamber that generates the prototype through successively depositing individual layers of a powdered material and then fusing the individual layers of the powdered material using a laser beam, the individual layers being fused together so as to form the prototype;
    transferring the prototype from the process chamber to a cooling chamber while preventing oxidation of the prototype;
    removing the cooling chamber from the process chamber; and
    cooling the prototype within the cooling chamber while flowing a nonoxidizing cooling medium over the prototype.

11. A rapid prototyping process as recited in claim 10 wherein the cooling step further comprises delivering the cooling medium to the prototype such that the prototype is enveloped by the cooling medium.

12. A rapid prototyping process as recited in claim 10 wherein the powdered material comprises at least one material selected from the group consisting of ceramics, metals and polymers.

13. A rapid prototyping process as recited in claim 10 wherein the transferring step further comprises flowing an inert gas over the prototype.

14. A rapid prototyping process as recited in claim 10 wherein the transferring step comprises placing the cooling chamber within the processing chamber and transferring the prototype to the cooling chamber.

15. A rapid prototyping process as recited in claim 10 further comprising the step of forming the prototype to have a surface resistant to penetration by gas prior to the prototype being removed from the processing chamber.

16. A rapid prototyping process as recited in claim 10 wherein deposition and fusing of the individual layers of powdered material are controlled by a computer.

17. A rapid prototyping process as recited in claim 10 wherein the cooling step comprises the steps of enclosing the prototype between an upper enclosure and a base member that form a gas-tight compartment.

18. A rapid prototyping process comprising the steps of:
    forming a three-dimensional prototype within a process chamber that generates the prototype through a computer-controlled operation by which individual layers of a powder are successively deposited and then fused using a laser beam, each of the individual layers being fused to a previously-formed individual layer such that the individual layers collectively form the prototype;
    placing a cooling chamber within the process chamber and transferring the prototype to the cooling chamber while flowing an inert gas through the process chamber and around the prototype;
    removing the cooling chamber from the process chamber; and
    cooling the prototype within the cooling chamber with a nonoxidizing cooling medium that flows over and around the prototype.

19. A rapid prototyping process as recited in claim 18 wherein the removing step comprises forming the prototype to have a surface resistant to penetration by gas prior to the prototype being removed from the processing chamber.

20. A rapid prototyping process as recited in claim 18 wherein the cooling step comprises the steps of enclosing the prototype between an upper enclosure and a base member that form a gas-tight compartment.

\* \* \* \* \*